(12) United States Patent
Davis

(10) Patent No.: US 7,547,068 B2
(45) Date of Patent: Jun. 16, 2009

(54) ADJUSTABLE SEAT FOR AUTOMOBILES AND TRUCKS

(76) Inventor: Bradley J. Davis, 11515 Leisure Dr., #2912, Dallas, TX (US) 75243

( * ) Notice: Subject to any disclaimer, the term of this patent is extended or adjusted under 35 U.S.C. 154(b) by 0 days.

(21) Appl. No.: 11/461,931

(22) Filed: Aug. 2, 2006

(65) Prior Publication Data

US 2006/0261656 A1  Nov. 23, 2006

Related U.S. Application Data

(63) Continuation-in-part of application No. 11/358,642, filed on Feb. 21, 2006, now abandoned.

(60) Provisional application No. 60/655,989, filed on Feb. 24, 2005, provisional application No. 60/668,113, filed on Apr. 4, 2005.

(51) Int. Cl.
  *B60N 2/02* (2006.01)
  *B60N 2/42* (2006.01)
  *A47C 7/02* (2006.01)
  *A47C 7/36* (2006.01)

(52) U.S. Cl. ............ 297/353; 297/216.1; 297/284.3; 297/354.12; 297/408; 297/410

(58) Field of Classification Search ............ 297/352, 297/440.21, 440.14, 230.1, 230.14, 440.15, 297/353, 284.3, 410, 408, 216.1, 354.12, 297/284.1; 280/728.1
See application file for complete search history.

(56) References Cited

U.S. PATENT DOCUMENTS

| 4,157,203 | A | * | 6/1979 | Ambasz .................. 297/300.5 |
| 4,181,357 | A | * | 1/1980 | Swenson et al. ............ 297/353 |
| 5,039,162 | A | | 8/1991 | Yoshida |
| 5,366,277 | A | * | 11/1994 | Tremblay ................... 297/464 |
| 5,636,900 | A | * | 6/1997 | Wilkie et al. ........... 297/423.19 |
| 5,836,647 | A | | 11/1998 | Turman |
| 5,836,651 | A | * | 11/1998 | Szerdahelyi et al. ........ 297/410 |
| 6,447,062 | B1 | * | 9/2002 | Jaekel et al. ............. 297/284.7 |
| 6,488,339 | B1 | * | 12/2002 | Finner et al. ........... 297/440.16 |

* cited by examiner

*Primary Examiner*—Milton Nelson, Jr.

(57) ABSTRACT

An automobile seat comprises a replacement adjustable back rest and an adjustable head and shoulder rest. Both the back rest and the head and shoulder rest are supported on the existing seat pan for independent vertical and angular adjustment.

5 Claims, 3 Drawing Sheets

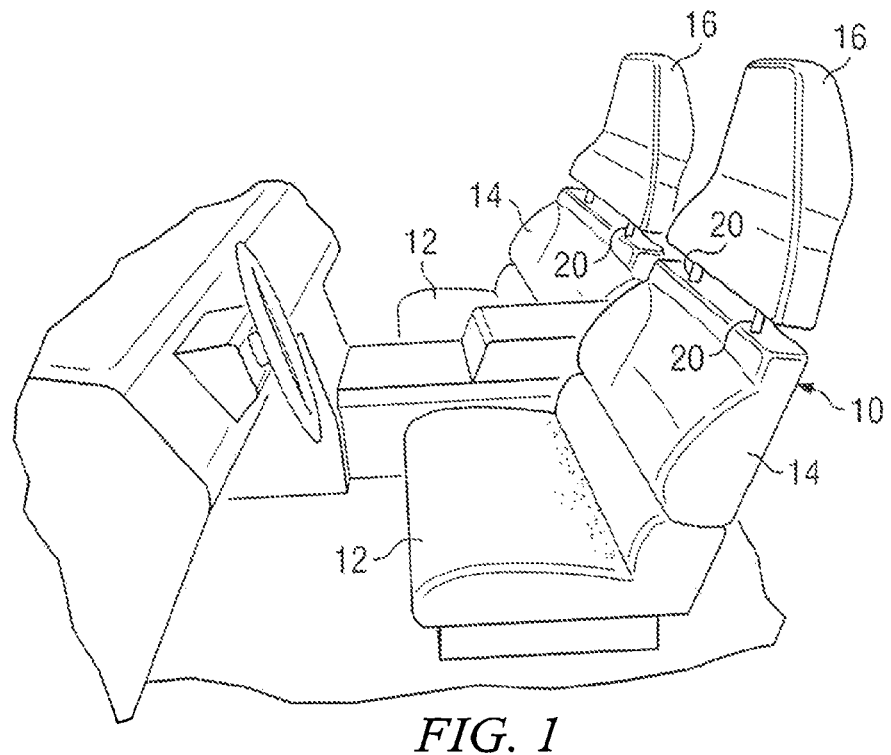
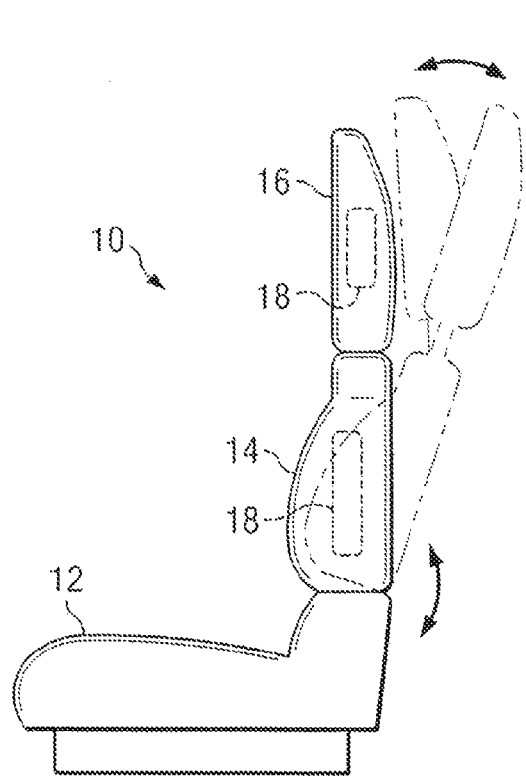
FIG. 2
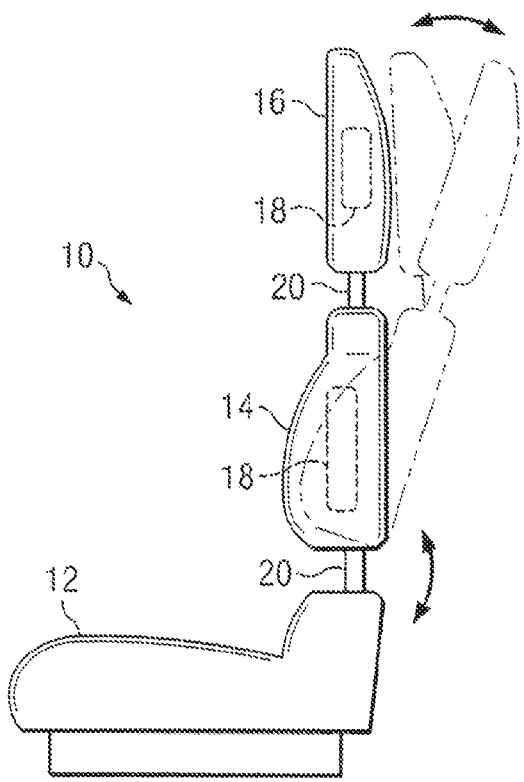
FIG. 3

ADJUSTABLE SEAT FOR AUTOMOBILES AND TRUCKS

CROSS-REFERENCE TO RELATED APPLICATIONS

This application is a continuation-in-part application of application Ser. No. 11/358,642 filed Feb. 21, 2006, now abandoned, the entire content of which is incorporated herein by reference; which claims priority on provisional patent application Ser. No. 60/655,989 filed Feb. 24, 2005, the entire content of which is incorporated herein by reference, and provisional patent application Ser. No. 60/668,113 filed Apr. 4, 2005, the entire content of which is incorporated herein by reference.

TECHNICAL FIELD

This invention relates generally to automobile seating, and more particularly to a replacement automotive seat back having a back rest and a head and shoulder rest supported for independent vertical and angular adjustment to facilitate safer and more comfortable seating in automobiles.

BACKGROUND AND SUMMARY OF THE INVENTION

Automobile seating is available in a number of varieties. Traditionally, bucket-style seating comprises a horizontally adjusting seat pan, a reclining back rest, and a head and shoulder rest which may or may not be adjustable vertically and may or may not be tiltable forward or reclined. Back rests are traditionally not individually vertically adjustable; traditional seating options allow the entire seat assembly to be adjusted vertically, but not the back rest individually. More recently, manufacturers of luxury automobiles have installed electrical-powered seating that is adjustable in a number of ways. However, multi-adjustable seating is not available in non-luxury automobiles without considerable cost to the consumer, if available at all.

Seating available in non-luxury vehicles generally comprise a horizontally adjusting seat pan, a fixed height, reclining back rest, and a head and shoulder rest. Most head rests are adjustable vertically and some head rests can be tilted. Depending on the driver's height, the head rest may not adjust high enough to provide proper support. Back rests generally only adjust vertically by raising the entire seat assembly. If the bask rest is not adjustable, it may not be positioned high enough to provide proper support for the upper back and shoulders. If the seat is not adjusted properly, a person riding in the seat risks serious injuries from a collision and may suffer pain from repetitive usage of non-supportive seating.

The present invention comprises an adjustable automobile seat back for existing automobiles and trucks which overcomes the foregoing and other difficulties which have long sense characterized the prior art. In accordance with the broader aspects of the invention the seat back is equipped with a back rest that adjusts both vertically and angularly and a head and shoulder rest that also adjusts vertically and angularly.

In accordance with the more specific aspects of the invention the back rest and the head and shoulder rest are supported on frame members extending from the existing seat pan. The frame members are constructed to allow both the back rest and the head and shoulder rest to tilt and recline. Adjusting the back rest and the head and shoulder rest vertically facilitates better support of the lower back, upper back, shoulders, head, and neck. Additionally, the ability to adjust the height of the back rest allows the driver to address ergonomic concerns such as lumbar support and neck support.

The present invention provides consumers with the option of purchasing adjustable, comfortable seating for existing automobiles and trucks at a more affordable cost than is currently available. The adjustable seat back of the present invention may be operated either manually or utilizing electric or hydraulic motors but does not require complex moving parts or joints susceptible to the wear and tear of repeated adjustments. Installation of the seat is comparable in time and cost to that of a traditional seat.

BRIEF DESCRIPTION OF THE DRAWINGS

A more complete understanding of the present invention may be had by reference to the following Detailed Description when taken in connection with the accompanying Drawings, wherein:

FIG. 1 is a perspective view illustrating an automobile seat comprising the present invention installed in a typical automobile;

FIG. 2 is side view of the seat of FIG. 1 illustrating the range of motion for reclining when not adjusted vertically;

FIG. 3 is view similar to FIG. 2 illustrating the range of motion for reclining when adjusted vertically;

DETAILED DESCRIPTION

Figure 4:
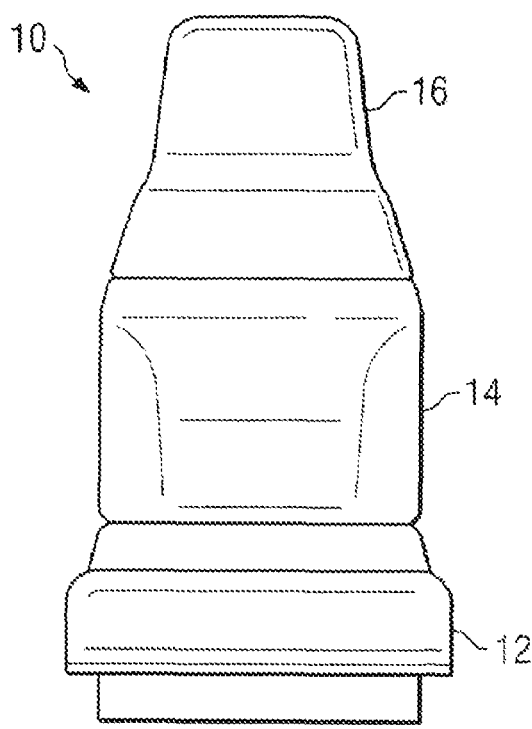
FIG. 4 is a front view of the seat of FIG. 1 illustrating the seat in an unadjusted position.

Referring now to the drawings, and particularly to FIG. 1 thereof, a pair of adjustable seats 10 comprising the present invention are shown installed in an automobile. The seat 10 is a bucket-style seat installed in either as front driver and passenger seating, or as rear passenger seating in a mini-van style automobile or a sport-utility vehicle.

FIG. 2 comprises a side view of the seat 10. An existing seat pan 12 is secured to the automobile frame along a set of rails which allows the seat pan to move forwards and backwards. A replacement back rest 14 sits directly atop the seat pan 12. The back rest 14 is adjustable from an erect position to a reclined position as illustrated. A head and shoulder rest 16 rests directly atop the back rest 14. The head and shoulder rest 16 is adjustable from an erect position to a reclined position independently of the back rest 14. When the back rest 14 is reclined, the head and shoulder rest 16 is either reclined at the same angle as the back rest 14, or tilted forward. The back rest 14 and/or the head and shoulder rest 16 may be equipped with air bags 18 on each side.

FIG. 3 comprises a side view of the seat 10 with both the back rest 14 and the head and shoulder rest 16 adjusted vertically. The back rest 14 and the head and shoulder rest 16 are affixed to frame members 20 which is embedded into the seat pan 12. The frame members 20 are constructed of steel with joints that are lockable in several orientations to facilitate the comfort of the driver or passenger. The frame members 20 may be located either internally of the seat components or along the sides thereof.

Figure 5:
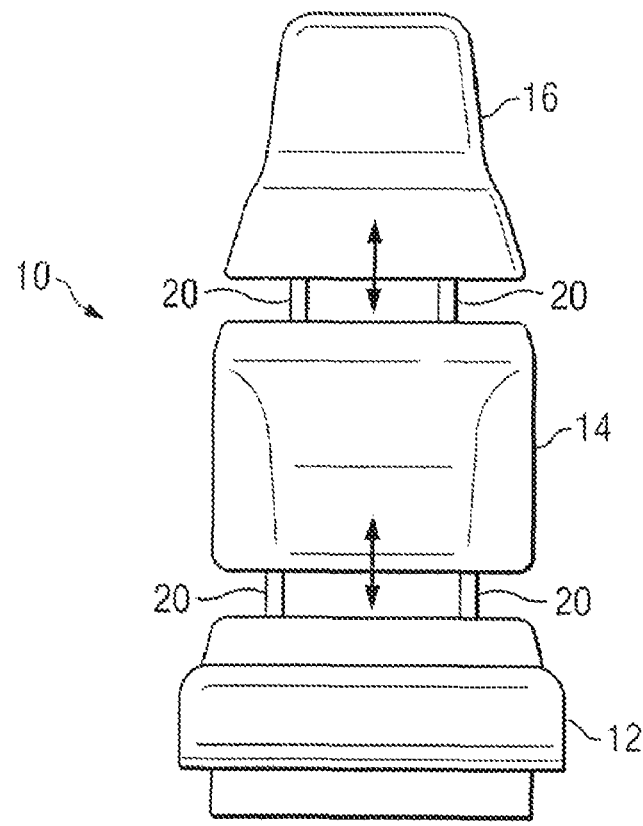
FIG. 5 is view similar to FIG. 4 illustrating the seat when adjusted vertically.

FIG. 4 comprises a front view of the seat 10 with the back rest 14 and the head and shoulder rest 16 in unadjusted positions. In FIG. 5 the back rest 14 and the head and shoulder rest 16 are shown in vertically adjusted positions. Both the back rest 14 and the head and shoulder rest 16 adjust vertically along the frame member 20 from a minimum of two (2) inches to a maximum of six (6) inches.

Figure 6:
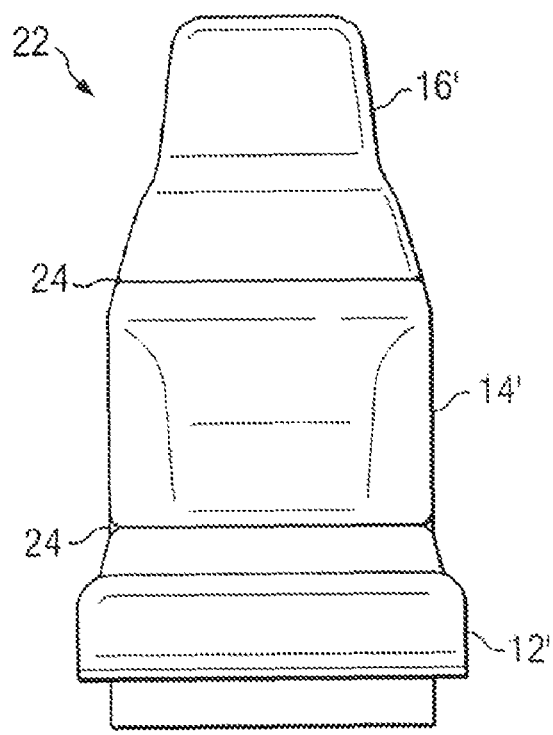
FIG. 6 is a view similar to FIG. 4 illustrating a second embodiment of the invention.
Figure 7:
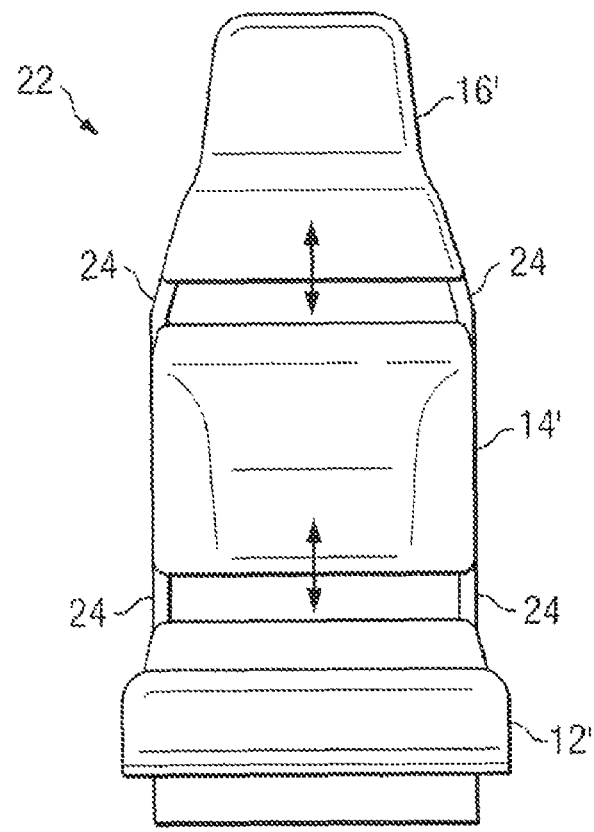
FIG. 7 is a view similar to FIG. 5 further illustrating the second embodiment of the invention.

FIGS. 6 and 7 illustrate an automobile seat 22 comprising a second embodiment of the invention. Many of the component parts of the automobile seat 22 are substantially identical in construction and function to component parts of the automobile seat 10 illustrated in FIGS. 1-5, inclusive, and described hereinabove in conjunction therewith. Such identical component parts are designated in FIGS. 6 and 7 with the same reference numerals utilized above in the description of the first embodiment of the invention but are differentiated therefrom by means of a prime (') designation.

The automobile seat 10 of FIGS. 6 and 7 differs from the automobile seat 10 in that the back rest 14' and the head and shoulder rest 16' are supported on telescoping frame members 24 which extend along the sides thereof.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. An automobile seat back for use with a seat pan, the seat back comprising:
   a back rest;
   a head and shoulder rest;
   at least one frame member coupling the head and shoulder rest to the back rest and configured for coupling the back rest to the seat pan;
   means for adjusting the height of the back rest upwardly relative to the seat pan to space apart said back rest from said seat pan to thereby form an opening between said back rest and said seat pan through which opening air may flow;
   means for adjusting the height of the head and shoulder rest upwardly relative to the back rest to space apart said head and shoulder rest from said back rest to thereby form an opening between said head and shoulder rest and said back rest through which opening air may flow;
   means for reclining the back rest relative to the seat pan; and
   means for angularly adjusting the positioning of the head and shoulder rest relative to the back rest.

2. The automobile seat back according to claim 1, wherein said automobile seat back is configured for use with an automobile bucket-style seat.

3. The automobile seat back according to claim 1 wherein the head and shoulder rest includes an air-bag safety device on each side of the head and shoulder rest.

4. The automobile seat back according to claim 1 wherein the back rest includes an air-bag safety device on each side of the back rest.

5. The automobile seat back according to claim 1, wherein said at least one frame member comprises at least two frame members extending along the sides of said automobile seat back.

* * * * *